Jan. 20, 1942.  B. SPECTOR  2,270,387
CUTTING TOOL
Filed July 13, 1938
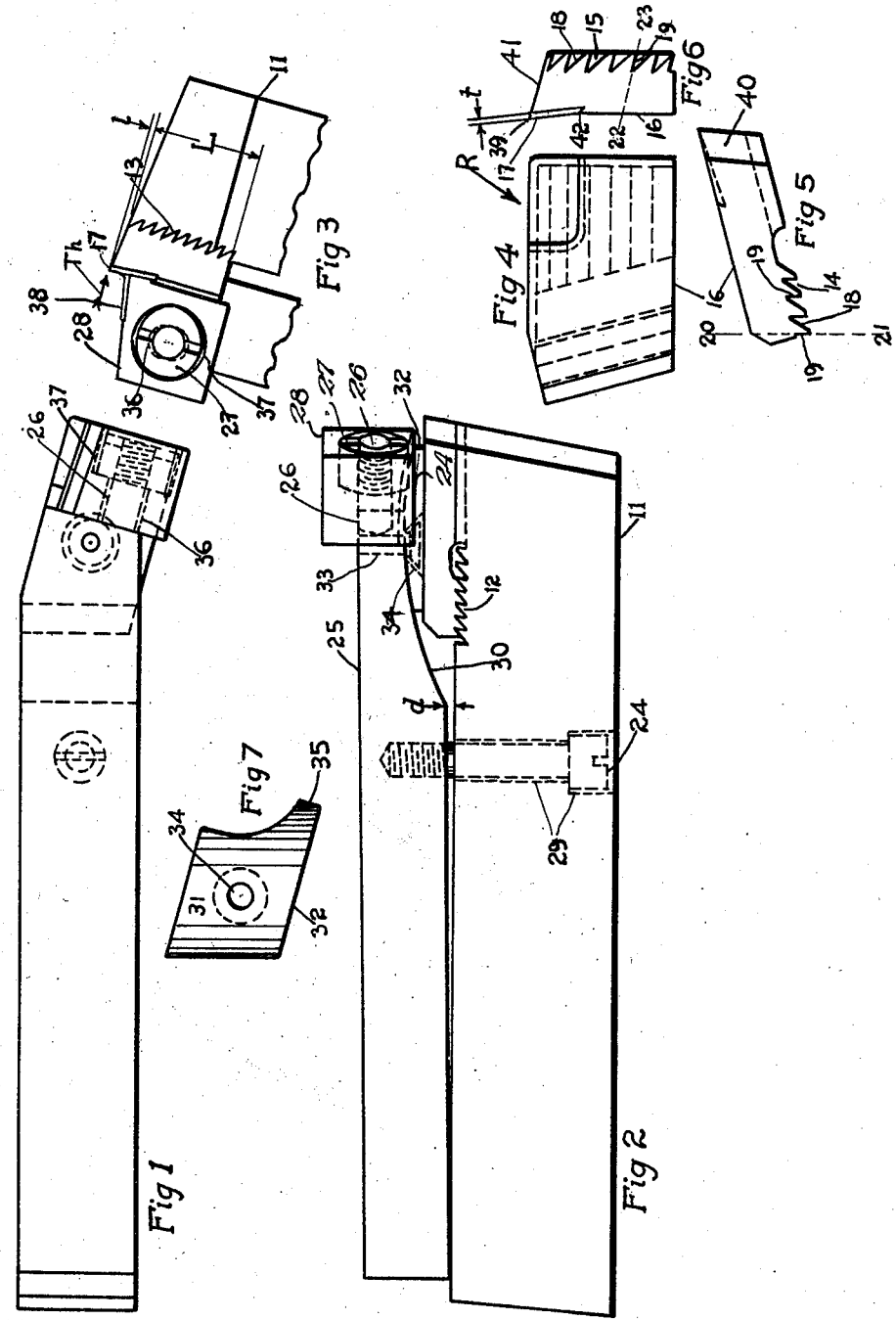
INVENTOR
Baruch Spector Patented Jan. 20, 1942

2,270,387

UNITED STATES PATENT OFFICE 2,270,387

CUTTING TOOL

Baruch Spector, Far Rockaway, N. Y.

Application July 13, 1938, Serial No. 219,046

8 Claims. (Cl. 29—96)

My invention relates to improvements in tipped tools and holders for same in which a hard metal such as tungsten carbide of low tensile rupture strength is brazed on to a less costly material having greater strength; and the objects of my improvements are to employ a minimum of hard metal and thereby obtain a maximum of strength and economy; to expedite the handling of the tool when making or grinding it by grinding a minimum of area; to restrict wear and tear so that replacement and reconditioning are limited to the tipped tool only; to provide a permanent chip breaker protected by the hardest grade of said hard metal, and thus to eliminate the wear and the re-grinding of the chip breaker.

I attain these and other objects by mechanisms illustrated in the accompanying drawing, in which—

Fig. 1 is a plan view of the tool assembly; Fig. 2 is a side elevation of it; Fig. 3 is a front view; Fig. 4 is a plan view, and Fig. 5 a side view of a detachable tool bit or tipped plate without the hard metal; Fig. 6 is a front view of the tipped plate having the hard metal braised thereto; Fig. 7 is a plan view of the detachable tipped plate holder.

Similar numerals refer to similar parts throughout the several views.

11 is a shank having two sets of saw or file teeth, 12 and 13, of very fine pitch. These file teeth conform with similar file teeth, 14 and 15, of a tipped plate 16 having a very thin plate 17 of hard material brazed thereto. If desired, the file teeth in shank 11 may be omitted and tipped plate 16 hardened. The two sets of filed teeth in 11 and 16 are designed so as to oppose a resultant thrust R so that the inclination lines 18 are self-evident. Lines 19 are in the direction 20—21, and 22—23, at an angle to the top and bottom surfaces to plate 16. By virtue of this design, a very small force for holding tipped plate 16 is required. Moreover, the shearing area resisting thrust R is a maximum.

A screw 24 holds a clamp 25 merely for handling the tool assembly as a unit, but great holding power and rigidity is attained by virtue of the fact that tools of this nature are clamped into tool posts by clamping screws with which each tool post is provided. Such tool post clamping screws are applied to top of clamp 25. The clamping screws of the tool holder (not shown) are of greater strength than screw 24.

Said clamp 25 has an integral cylindrical extension 26. The end of 26 is threaded for a nut 27 which engages a chip breaker block 28 upon the extension, as hereinafter to be described.

When inserting the tool into a tool assembly post as a unit and applying pressure with the screws (not shown) of a machine tool or tool post on the top of said clamp 25, the clamp has a tendency to deflect. I provide for such deflection of clamp 25 by allowing clearance hole 29 for screw 24 in shank 11; by making the distance $d$ small enough so that the elastic limit of clamp 25 shall not be exceeded when $d$ is reduced to zero and the various parts of the tool become as rigid and as useful as one part; and by providing a curved surface 30 in the under side of clamp 25 to conform with a curved surface 31 of a tipped plate holder 32. Thus regardless of the flexure of clamp 25, tip plate 16 will be held flat on its entire surface. 33 is a flat head shoulder pin driven into clamp 25 through an enlarged hole 34 of tipped plate holder 32 so that the latter hangs loosely on the under side of clamp 25, permits flexing of the clamp and allows handling of parts 25 and 32 together at a time of assembling, or adjusting (see below).

When cutting by means of tools of this nature, there is a thrust $Th$. I counteract this thrust by making very short the distance $l$ to which the tool projects at an angle. Where the length L of the base of the tool is long, and by providing an extension 35 on the tipped plate holder 32. When detachable plate 16 is moved a tooth forward or toward the cutting side, the ratio of L to $l$ will always remain large.

The chip breaker block 28 has two oblonged holes, 36 and 37: the former fits cylindrical extension 26, and the larger oblonged hole 37 is a clearance hole for nut 27. This provides a convenient means for adjusting the chip breaker block at the desired distance from a cutting edge 39 (Fig. 6). Such adjustment is necessary because said distance is a function of the feed of the tool relatively to the work being cut by means of this tool. Onto a corner of the chip breaker block a plate 38 of the hardest material is brazed, over which chips curl and break. The chip breaker is separate from the thin cutting plate 17, which is brazed to tipped plate 16, and the chip breaker does not wear and does not have to be re-ground. Only plate 16 with the hard material 17 is ground when the latter becomes dull. When the cutting edge is to be resharpened, I grind only surfaces 40 and 41, but never surface 42 as has been done heretofore.

As the chips exert pressure on the chip breaker block, the latter has a tendency to rotate on the cylindrical part 26. Thus the lower portion of the chip breaker closes tightly upon the cutting plate 17. This is a desirable feature to prevent chips from entering underneath the chip breaker block.

My tool is used like any other tipped tool known in this art. When a cutting edge 39 becomes dull and re-grinding is necessary, the operator merely loosens screw 24, inserts another plate 16, and returns the dull tipped plate for grinding department. By means of screw 24 and pin 33, the operator handles the assembled tool as if it were made of one part.

Some of the advantages of my invention are: the necessity of also grinding a chip breaker whenever the tool is sharpened, is eliminated; after many grindings, a tool shank of the old art is partly destroyed, requiring re-milling, re-brazing, etc., whereas I grind a thin plate 16; the old design requires a greater thickness T than my design requiring a thin plate of thickness of the hard metal tip (Fig. 6) thus reducing the cost and increasing the strength of the tool; the fine filed teeth 12 and 13 permit the movement of the plate 16 with its cutting material 17 to the front and to the cutting side after re-grinding, and at all times retain the same advantage of opposing the resultant R (Fig. 4).

The direction of R is not fixed. Hence I provide two sets of filed teeth; both of them will always be components of R at all times. Above all, the advantage of tipped plate 16 and cutting edge 17 as well as other parts of my tool is that they may be manufactured more economically because they may be made to suit a large variety of sizes of shanks 11 Fig. 2; inexpensive tipped plate 16 may be tipped with a variety of grades of hard material 17, and used interchangeably for any took shank 11, thus increasing the adaptability of my tools.

In the above specification and accompanying drawing, I merely selected a preferred embodiment of my invention. I do not limit myself to this preferred embodiment as many modifications are possible. I claim:

1. A tool holder adapted to hold a cutting tool of predetermined thickness and comprising a shank, a clamp superimposed upon said shank and adapted to be clamped onto said shank by a tool post in which the holder is to be engaged, a swivel plate flat on one side at which it may rest upon the cutting tool and convex upon its opposite side, and an arcuate recess in the side of said clamp facing said shank and fitting the convex side of said swivel plate, said plate and a cutting tool therebelow being interposed between corresponding ends of the shank and the clamp whereas the other end of the clamp rests directly upon the other end of the shank, when the tool holder is assembled.

2. A tool holder to hold a cutting tool of predetermined thickness and comprising a shank, a clamp superimposed upon said shank and adapted to be clamped onto said shank by a tool post in which the holder is to be engaged, a swivel plate flat on one side at which it may rest upon the cutting tool and convex upon its opposite side, an arcuate recess in the side of said clamp facing said shank and fitting the convex side of said swivel plate, said plate and a cutting tool therebelow being interposed between corresponding ends of the shank and the clamp, whereas the other end of the clamp rests directly upon the other end of the shank, when the tool holder is assembled, and a retaining means clamping said shank and clamp together over said plate and tool but permitting said clamp to yield to further compression by a tool post.

3. A cutting tool having substantially parallel top and bottom sides and tipped with hard cutting metal at a corner of one of said sides, and having two sets of parallel file teeth cut into the other one of said sides and serving to engage upon a tool holder, the teeth of each of said sets being parallel to each other, and the teeth of one of said sets extending angularly to the teeth of the other set.

4. A cutting tool having substantially parallel top and bottom sides and tipped with hard cutting metal at a corner of one of said sides, and having two sets of parallel file teeth cut into the other one of said sides and serving to engage upon a tool holder, said sets being relatively spaced and separated by a groove, the teeth of each of said sets being parallel with each other, and the teeth of one of said sets extending substantially normal to those of the other one of said sets.

5. A tool holder adapted to hold a cutting tool having substantially parallel top and bottom sides, tipped with hard cutting metal at a corner of one of said sides and having two sets of teeth cut into the other one of said sides, the teeth of one set extending at a predetermined angle to the teeth of the other set, said holder comprising a shank, a clamp superimposed upon said shank and adapted to be clamped onto said shank by a tool post in which the holder is to be engaged, a swivel plate flat on one side at which it may rest upon the cutting tool and convex upon its opposite side, and an arcuate recess in the side of said clamp facing said shank and fitting the convex side of said swivel plate, said plate and a cutting tool therebelow being interposed between corresponding ends of the shank and the clamp, whereas the other end of the clamp rests directly upon the other end of the shank, when the tool holder is assembled, said other end of said shank having a tooth formation substantially matching and adapted to be engaged by teeth on one side of the cutting tool.

6. A chip breaker tipped upon one side with a hard cutting metal, said metal extending up to one edge of said side, said breaker having a bore extending substantially parallel with said side and serving to receive an arbor by which the breaker may be swivellably mounted above a tool cutting the chips to be broken.

7. A chip breaker tipped upon one side with a hard cutting metal, said metal extending up to one edge of said side, said breaker having a bore extending substantially parallel with said edge, and serving to receive an arbor by which the breaker may be swivellably mounted above a tool cutting the chips to be broken.

8. A tool holder comprising clamping means for engaging a tool so that the tool extends at a predetermined position from the holder, a chip breaker tipped upon one side with a hard cutting metal, said metal extending up to one edge of said side, said breaker having a bore extending substantially parallel with said edge, and an arbor mounted above said position on said holder, disposed in the direction in which a tool engaged in the holder extends from the holder and engaged in said bore, so that said edge of the breaker may rest on said tool.

BARUCH SPECTOR.